United States Patent
Steinbok et al.

(10) Patent No.: US 9,438,687 B2
(45) Date of Patent: Sep. 6, 2016

(54) EMPLOYING PRESENCE INFORMATION IN NOTEBOOK APPLICATION

(71) Applicant: Microsoft Corporation, Redmond, WA (US)

(72) Inventors: Nicole Steinbok, Seattle, WA (US); Daniel Escapa, Bellevue, WA (US); David Tse, Kirkland, WA (US); Thomas Wionzek, Kirkland, WA (US); Olya Veselova, Redmond, WA (US); David Rasmussen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 14/109,608

(22) Filed: Dec. 17, 2013

(65) Prior Publication Data

US 2015/0172403 A1    Jun. 18, 2015

(51) Int. Cl.
| | |
|---|---|
| *G06F 3/00* | (2006.01) |
| *H04L 29/08* | (2006.01) |
| *G06F 17/24* | (2006.01) |
| *G06Q 50/00* | (2012.01) |
| *G06Q 10/10* | (2012.01) |

(52) U.S. Cl.
CPC .............. *H04L 67/24* (2013.01); *G06F 17/241* (2013.01); *G06Q 10/10* (2013.01); *G06Q 50/01* (2013.01)

(58) Field of Classification Search
CPC ....................................................... H04L 67/24
USPC .......................................... 709/205; 715/753
See application file for complete search history.

(56) References Cited

U.S. PATENT DOCUMENTS

| | | | |
|---|---|---|---|
| 8,069,166 B2 | 11/2011 | Alvarado et al. | |
| 2008/0005235 A1 | 1/2008 | Hegde et al. | |
| 2008/0244418 A1 | 10/2008 | Manolescu et al. | |
| 2010/0299615 A1 | 11/2010 | Miluzzo et al. | |
| 2011/0289404 A1* | 11/2011 | Fleur .................... | G06F 17/241 715/255 |
| 2011/0296000 A1 | 12/2011 | Ferris et al. | |
| 2011/0314482 A1 | 12/2011 | Cupala et al. | |
| 2013/0185651 A1* | 7/2013 | Wionzek ............... | H04L 67/24 715/753 |
| 2013/0212250 A1 | 8/2013 | Kleppner et al. | |

OTHER PUBLICATIONS

"Hitachi Solutions Releases User-Friendly Advanced Collaboration System", Published on: Feb. 14, 2012, Available at: http://www.hitachi-solutions.com/news/release/2012/pdf/0214.pdf.

(Continued)

*Primary Examiner* — Kyung H Shin
(74) *Attorney, Agent, or Firm* — Monica Adjemian; Jim Ross; Micky Minhas

(57) ABSTRACT

To employ presence information in conjunction with a notebook application, presence information is determined for one or more users associated with a notebook application. The presence information may be obtained from a variety of sources, such as a communication application, a social or professional network, and a presence module of the notebook application. Once determined, the presence information is presented to the users through a user interface in conjunction with a location within the notebook application or through a separate user interface. The notebook application may further track the presence information for the users interacting with the notebook application. The users may then be enabled to interact with the user interface to use the presented presence information in conjunction with content maintained by the notebook application.

18 Claims, 10 Drawing Sheets

(56) References Cited

OTHER PUBLICATIONS

Hupfer, et al., "Introducing Collaboration into an Application Development Environment", In ACM Conference on Computer Supported Cooperative Work, Nov. 6, 2004, 4 pages.

Daniel, Bryan, "Adding Presence Awareness to your IBM Workplace Portlet", Published on: May 31, 2005, Available at: http://www.ibm.com/developerworks/lotus/library/wp-api-presence/.

Voida, et al., "Share and Share Alike: Exploring the User Interface Affordances of File Sharing", In Proceedings of the ACM Conference on Human Factors in Computing Systems, Apr. 22, 2006, 10 pages.

Houri, et al., "Presence and Instant Messaging Peering Use Cases", In Proceedings of RFC 5344 Informational, Oct. 2008, 9 pages.

"International Search Report and Written Opinion Issued in PCT Application No. PCT/US2014/069632", Mailed Date: Feb. 25, 2015, 11 Pages.

"Second Written Opinion Issued in PCT Application No. PCT/US2014/069632", Mailed Date: Aug. 18, 2015, 7 Pages.

"International Preliminary Report on Patentability Issued in PCT Application No. PCT/US2014/069632", Mailed Date: Jan. 21, 2016, 8 Pages.

\* cited by examiner

EMPLOYING PRESENCE INFORMATION IN NOTEBOOK APPLICATION

BACKGROUND

A notebook may include a collection of documents with a common theme for a user to keep track of and edit. For example, a notebook may be created that corresponds to a project. The notebook may have different tabs associated with different sections, and those sections may include, for example, a section marketing research, a section for specification(s), a section for meeting notes and schedules, and a home page that generally describes the project. Each of the sections may include different pages, and each page may include one or more documents. The documents may include spreadsheets, word processing documents, emails, calendars, presentations, and any other document that may be part of the project. Thus, a notebook may represent a knowledge base that includes a wide variety of different documents, and even different types of documents.

In a collaborative environment, multiple users may access, view, and edit any of the sections, pages, and/or documents within the notebook. Having multiple users maintain separate copies or periodically consolidate copies of the same notebook may result in degraded user experience. Users may not be able to take advantage of capabilities of the collective environment provided by the notebook application.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to employing presence information in conjunction with a notebook application. Presence information may be determined for one or more users associated with a notebook application. In some embodiments, the presence information may be obtained from a variety of presence services, such as a communication application, a social or professional network, and a presence module of the notebook application. Once determined, the presence information may be presented to the one or more users through a user interface in conjunction with a location within the notebook application or through a separate user interface. In further embodiments, the one or more users may then be enabled to interact with the user interface to employ the presented presence information in conjunction with contents of the notebook application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
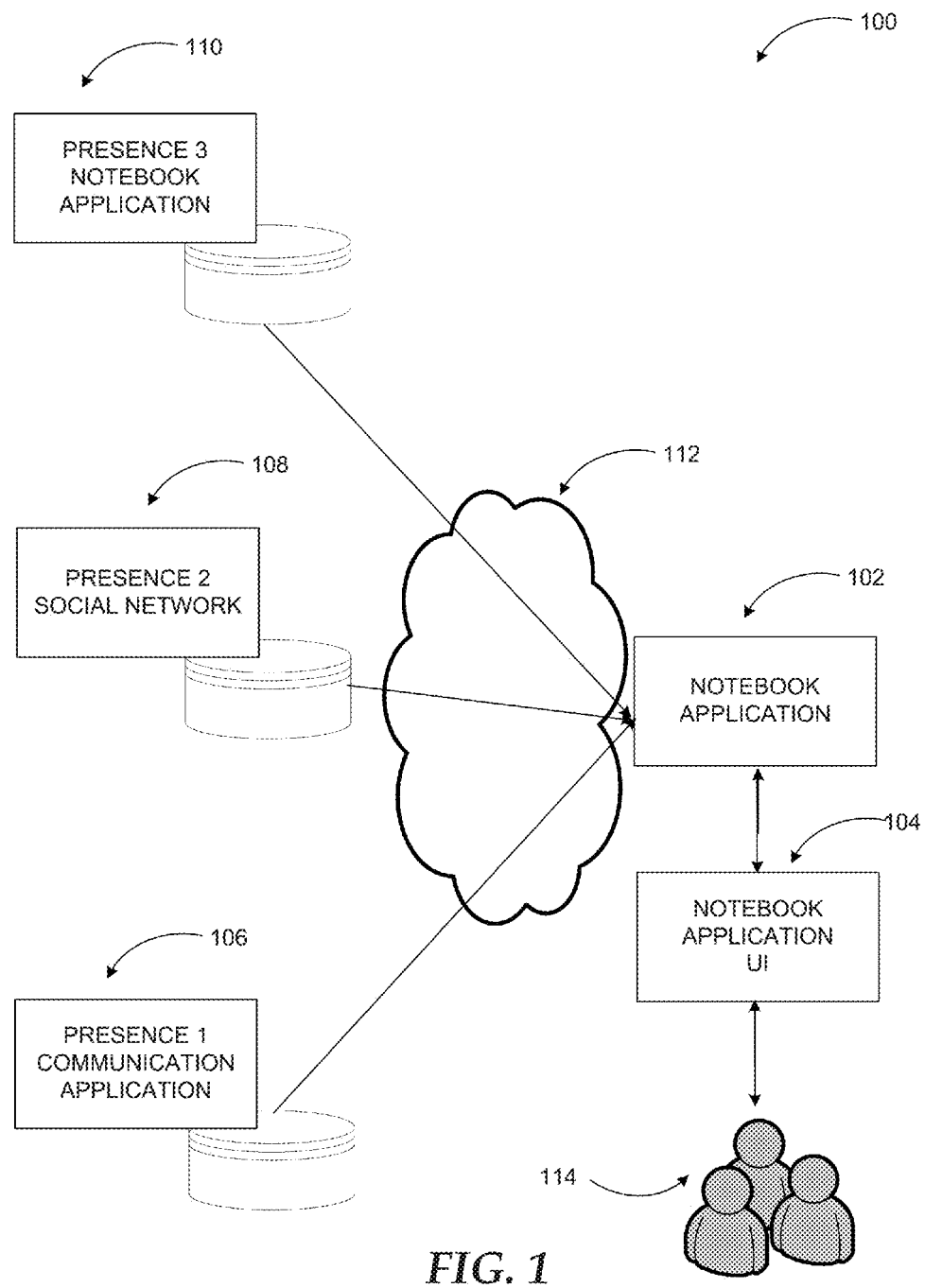
FIG. 1 includes a conceptual diagram illustrating an example method to employ presence information in conjunction with a notebook application.

As briefly described above, employing presence information in conjunction with a notebook application may include determining presence information for one or more users associated with the notebook application and presenting the presence information to the one or more users through a user interface within the notebook application. The one or more users may then be enabled to interact with the user interface to take advantage of the presented presence information in context of the various documents maintained by the notebook application.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for employing presence information in conjunction with a notebook application. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a conceptual diagram illustrating an example method to employ presence information in conjunction with a notebook application. A notebook application 102 may be coupled to one or more presence services (e.g., 106, 108, and 110) via a cloud 112 to determine presence information for users 114 associated with the notebook application 102. Example presence services may include a communication application 106, a social network 108, a professional network (not shown), and a presence module 110 of the notebook application.

Once the presence information is determined, the notebook application 102 may present the presence information to the users 114 through a user interface 104 associated with the notebook application 102. The presence information may be presented through a user interface in conjunction with a location within the notebook application, such as a document, an object, a file, a page, a section, and/or a notebook, or as a separate user interface. Furthermore, the presence information may be presented using a textual scheme, a graphical scheme, an audio scheme, an animation scheme, a coloring scheme, a highlighting scheme, and/or a shading scheme to enhance the presentation of the presence information in the user interface. The presence information may include which users are currently viewing and/or editing a document, an object, a file, a section, a page, and/or a notebook within the notebook application. Upon detection of a change in presence of one or more of the users 114 associated with the notebook application 102 by the presence services, the notebook application 102 may automatically update the presence information presented through the user interface 104.

The users 114 may be enabled to interact with the user interface to use the presented presence information by hovering over or selecting a user interface element using a tap action, a swipe action, a mouse, a pen input, and/or a keyboard input. For example, by selecting one user interface element, the users 114 may be enabled to communicate with one or more other users. The users 114 may also be enabled to follow another user and may navigate to a location, such as a document, an object, a file, a page, a section, or another notebook, at which the other user is located within the notebook application through an actionable link provided within the presented presence information. A user may be enabled to define the presence information to be presented through the interface to the user. For example, the user may only want the presence information associated with the team members working on a specific section in a notebook to be presented. A user may further be enabled to set credential based or permission based limitations on the presence information that may be presented to the other users through the user interface 104.

In another embodiment, the presence information for users 114 within the notebook application may be tracked and presented through the user interface. The tracked presence information may include how many times a document, an object, a file, page, section and/or notebook was viewed and by which users, how many times a document, object, file, page, section and/or notebook was edited and by which users, how frequently a document, object, file, page, section and/or notebook was viewed, and how frequently a document, object, file, page, section and/or notebook was edited. Other information such as an age and a size of a document, object, file, page, section and/or notebook within the notebook application may be presented along with the tracked presence information. The tracked presence information may be presented using a textual scheme, a graphical scheme, an audio scheme, an animation scheme, a coloring scheme, a highlighting scheme, and/or a shading scheme. The tracked presence information may also be provided to one or more presence services coupled to the notebook application, such as the communication application 106 and the social network 108. Statistical information based on the tracked presence information may also be presented to the users. The statistical information may include which document, page, section, and/or notebook has the most views and/or edits from the users and an average viewing and/or editing time for a document, object, file, page, section and/or notebook. Using the statistical information, the notebook application may automatically adjust a frequency of collaborative updates on documents, pages, sections, and or notebooks based on how frequently they are viewed and/or edited. Furthermore, the notebook application may automatically suggest to a user one or more documents, objects, files, pages, sections, and/or notebooks to view based on the statistical information associated with the notebook application.

In one example, users 114 may prioritize a document, page, section and/or notebook that is presented as having frequent view and/or edits. In another example, the tracked presence information presented may enable the users 114 to see which documents, objects, files, pages, sections, and/or notebooks have seldom been viewed or edited and the users 114 may choose to clean up the notebook application to rid of those documents, pages, sections, and or notebooks. The users 114 may also choose to rediscover those documents, objects, files, pages, sections, and/or notebooks.

The example system in FIG. 1 has been described with specific applications, user interface presentations, and user interactions to employ presence information in a notebook application. Embodiments are not limited to the system according to this example configuration. Employment of presence information in conjunction with a notebook application may be implemented in configurations employing fewer or additional components, and performing other tasks. Furthermore, using presence information in a notebook application may be implemented in a similar manner using the principles described herein.

Figure 2:
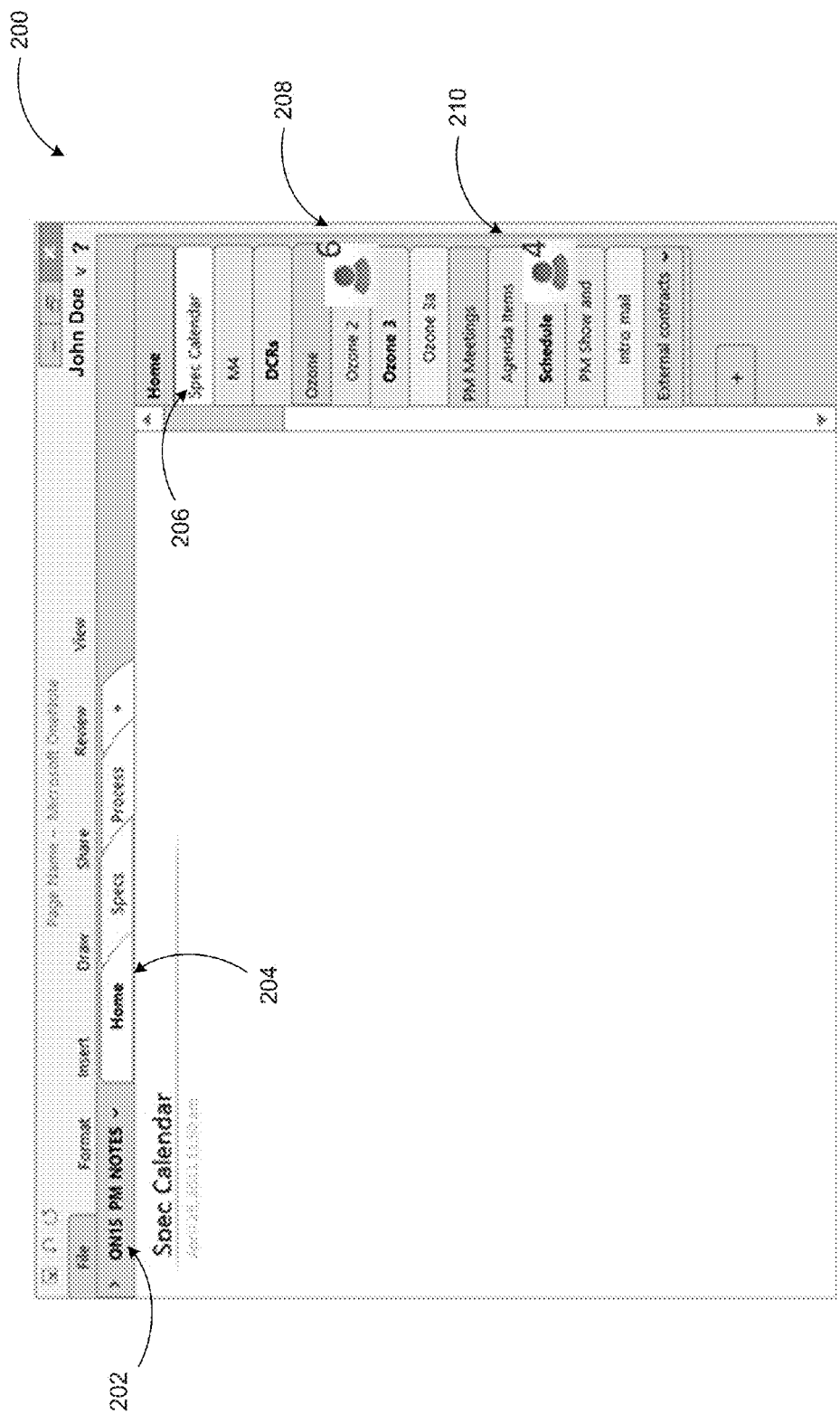
FIG. 2 illustrates an example presentation of presence information through a user interface in a notebook application.

FIG. 2 illustrates an example presentation of presence information through a user interface in a notebook application. A notebook application may include a multitude of documents following a common theme that may be organized hierarchically within the notebook application into objects, files, pages, sections, and/or notebooks. The documents may include spreadsheets, word processing documents, emails, calendars, presentations, and any other document. For example, a notebook 202 within the notebook application may include all documents related to a company project. The notebook 202 may have one or more sections 204, such as Home, Specifications, and Process, where documents related to that aspect of the company project are located. The sections 204 may further have one or more pages 206, such as a specifications calendar, a meeting, agenda terms, and schedule to further group the documents based on more specific aspects of the company project they are related to.

To employ presence information in the notebook application, presence information for users associated with the notebook application may be determined as described in FIG. 1. Once determined, the presence information may be presented to the users through a user interface in conjunction with a location within the notebook application, such as a document, an object, a file, a page, a section, and/or a notebook of the notebook application, as illustrated. The presence information may include which users are currently viewing and/or editing a document, a section, an object, a file, a page, and/or a notebook within the notebook application. For example, a graphical and/or textual scheme may be employed, where an icon and a numerical value are positioned concurrently above a location within the notebook 202 to represent the number of users currently at the location (e.g., 208, 210). As illustrated by 208, six users are currently viewing and/or editing documents within a page under the Home section of the example notebook. As illustrated by 210, four users are currently viewing and/or editing documents within a Schedule page under the Home section of the example notebook. Other schemes such as an audio scheme, an animation scheme, a coloring scheme, a highlighting scheme, and a shading scheme may also be employed in conjunction with a document, an object, a file, a page, a section, and/or a notebook in the notebook application to present the presence information. Presence information may further be determined for users associated with other notebooks in the notebook application and the presence information may be presented to the users in a similar manner as discussed above. In other embodiments, the presence information may be presented to the users through a separate user interface. The separate user interface may include the presence information in form of a list, a map, or other similar diagram. The separate user interface may be positioned at any location on the user interface where the location may be pre-determined or defined by the users.

The notebook application may also track presence information for the users within the notebook application and present the tracked presence information through the user interface in conjunction with a location within the notebook application or through a separate user interface. The tracked presence information may include how many times a document, object, file, page, section, and/or notebook was viewed and by which users, how many times a document, object, file, page, section, and/or notebook was edited and by which users, how frequently a document, object, file, page, section, and/or notebook was viewed, and how frequently a document, object, file, page, section, and/or notebook was edited. Other information such as a size and an age of a document, object, file, page, section, and/or notebook may also be included. The tracked presence information may be presented using a textual scheme, a graphical scheme, an audio scheme, an animation scheme, a coloring scheme, a highlighting scheme, and/or a shading scheme to enhance the presentation of the tracked presence information in the user interface. Statistical information, such as which document, object, file, page, section, and/or notebook has the most views and/or edits, may also be presented to the users based on the tracked presence information.

Figure 3A:
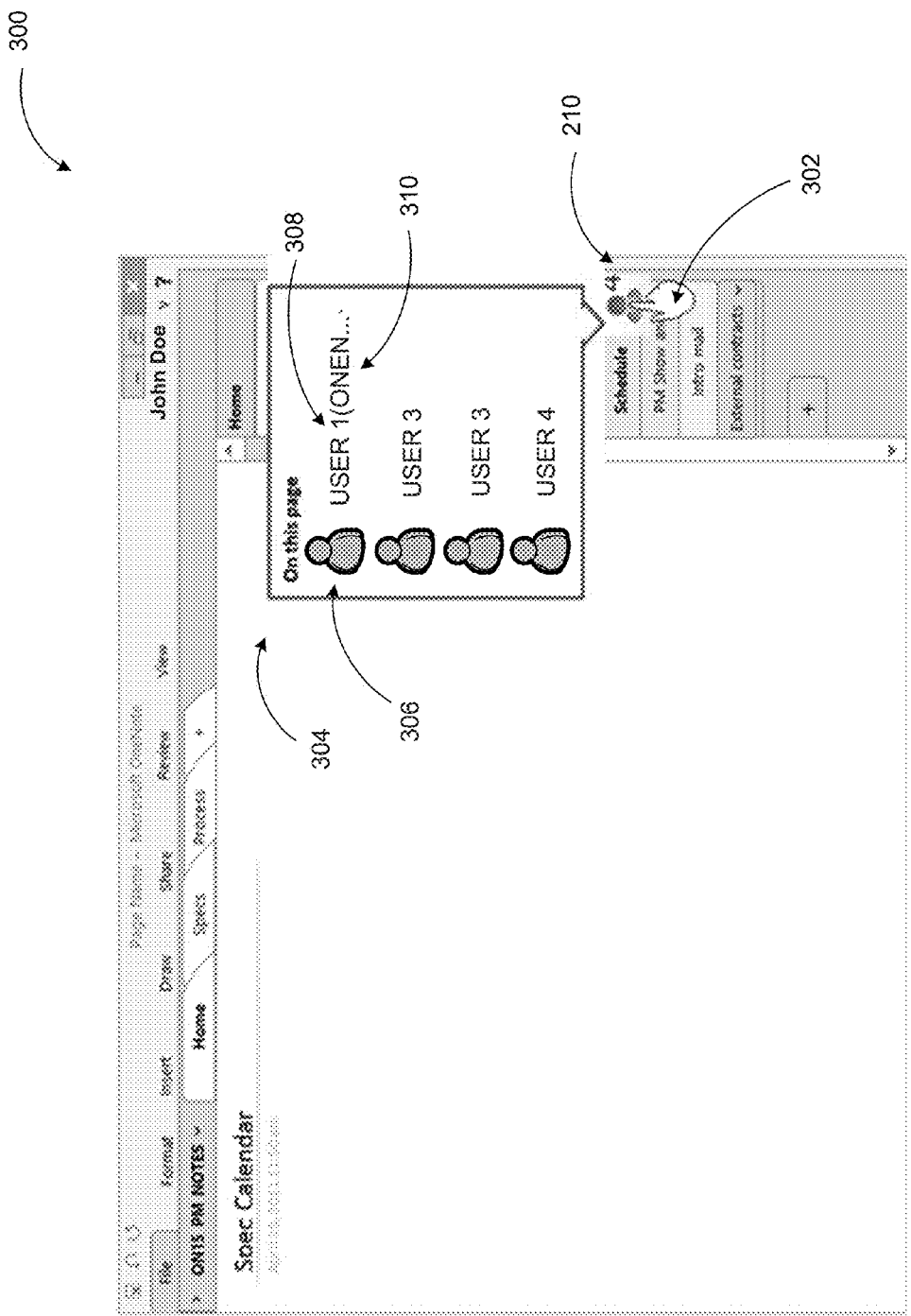
FIG. 3A-C illustrate example user interactions with the user interface to employ presence information in conjunction with contents of a notebook application.
Figure 3B:
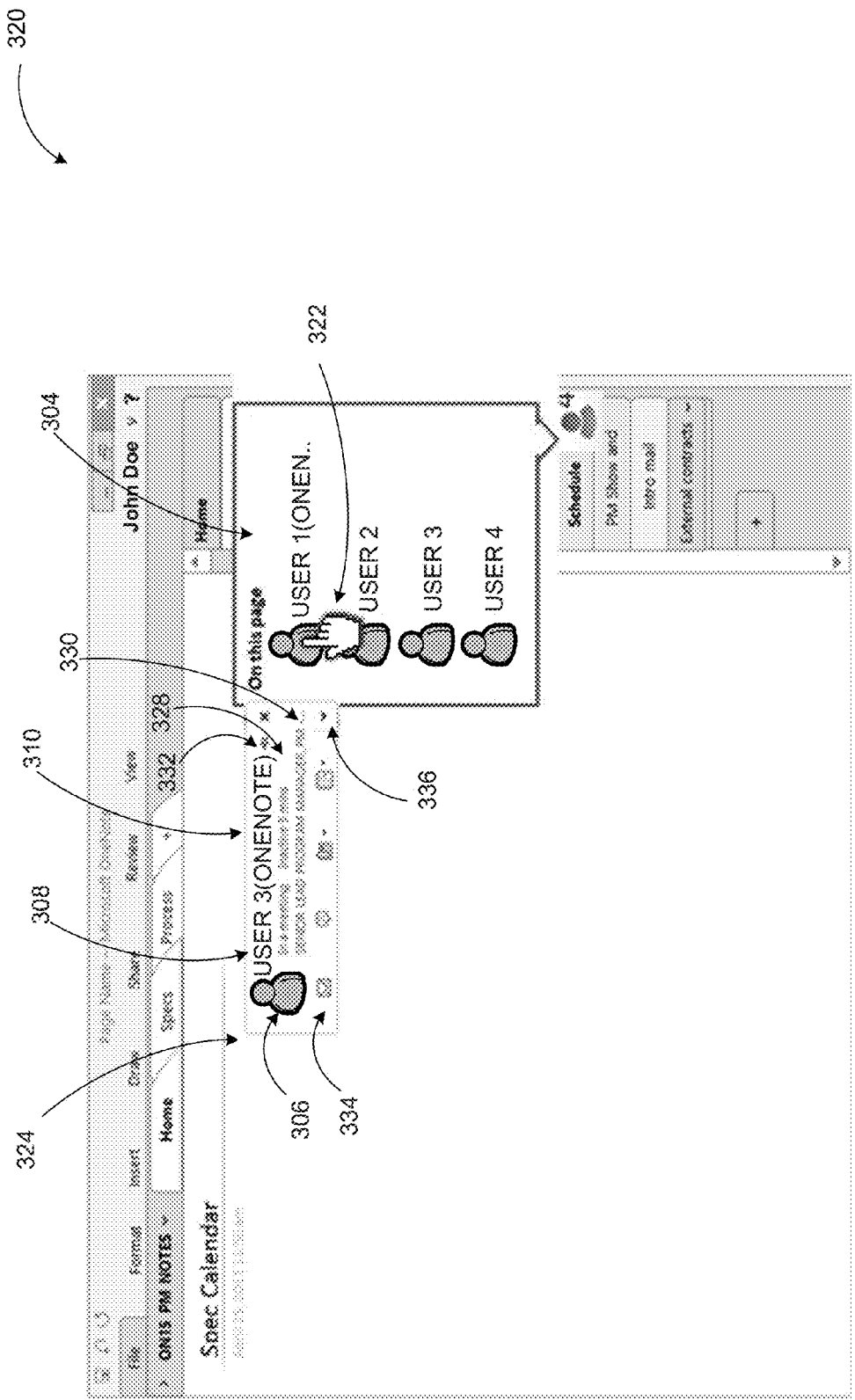
Figure 3C:
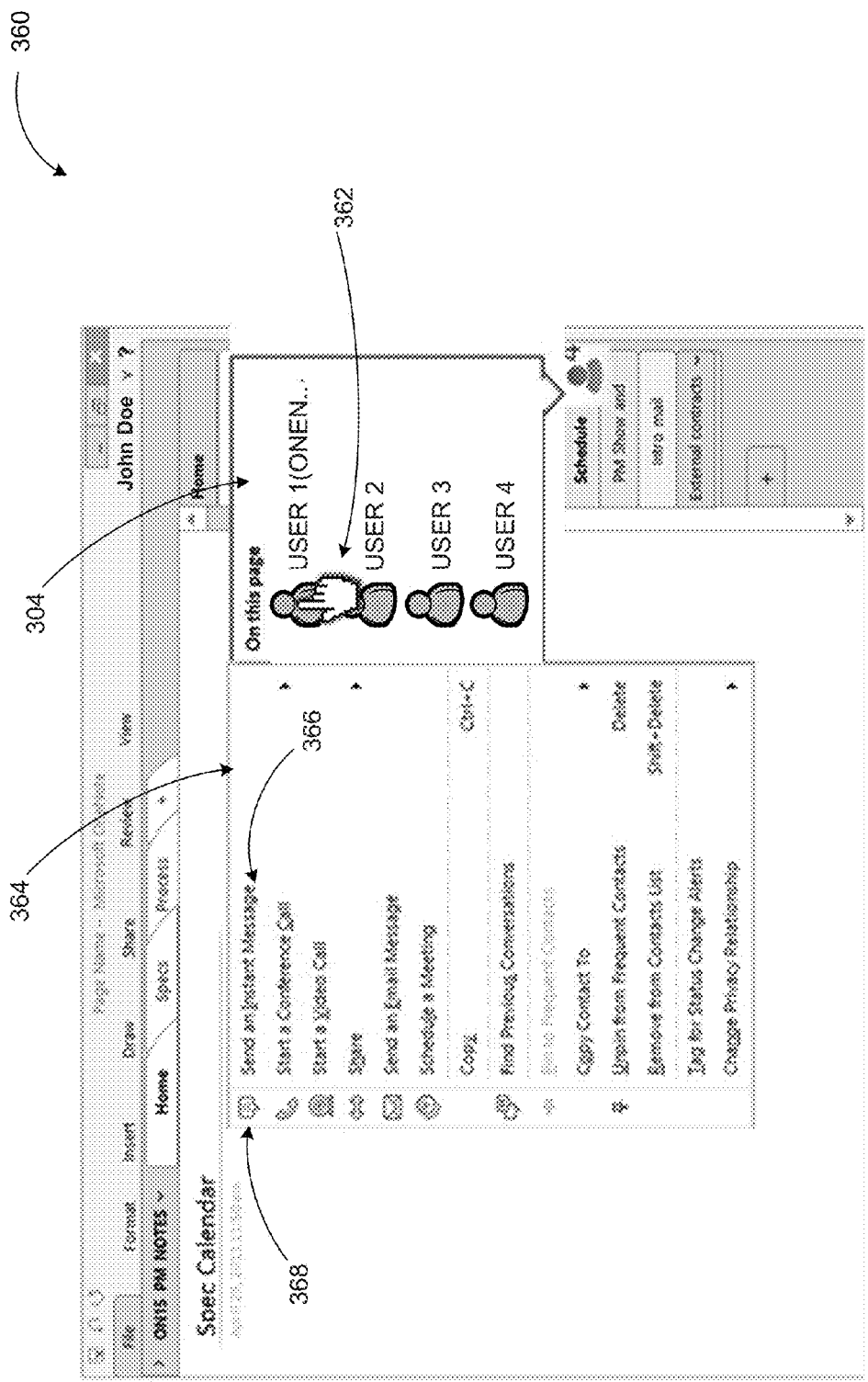

FIG. 3A-C illustrate example user interactions with the user interface to employ presence information in conjunction with contents of a notebook application. Once presence information for users associated with the notebook application has been determined and presented to the users through a user interface as described above in FIG. 1 and FIG. 2, the users may be enabled to interact with the presence information through the user interface.

A user may interact with the user interface by hovering over or selecting an element using a tap action, a swipe action, a mouse input, a pen input, and/or a keyboard input. For example, in FIG. 3A, a user may perform a tap action 302 to select the icon 210 that represents four users are currently viewing and/or editing documents within a Schedule page under the Home section of the example notebook. In response, the notebook application may present a first display element 304 that lists the four users. The first display element 304 may include a visual identification 306 of a user, a textual identification 308 of a user, and/or a location 310 of a user.

For example, in FIG. 3B, the user may then perform a second tap action 322 to select one of the four users listed in the first display element 304. In other embodiments, two or more users may be selected simultaneously. In response, the notebook application may present a second display element 324 that, similar to the first display element 304, may include the visual identification 306 of the selected user, the textual identification 308 of the selected user, and the location 310 of the selected user. The second display element 324 may also include status information 328 of the selected user obtained from a communication application, a social network, a professional network, or another presence service. For example, the status information 328 may include if the selected user is available, away, in a meeting, or offline. The second display element 324 may also include contact card information about the selected user obtained from a communication application, a social network, a professional network, and/or other similar application or network. For example, the contact card information may include which company the user works for, a position of the user in a company, contact information, and other similar information. A pin icon 332 may further enable a user to pin the selected user to frequent contacts within the notebook application or within another application.

The second display element 324 may further include a toolbar 334 comprising icons, enabling further interaction with the user interface. The icons upon actuation, for example, may enable a user to initiate communication with the selected user using email, instant message, contacting via a social or professional network, initiating an audio or video call in a multi-modal communication application, or comparable call options. The user may also be enabled to schedule a meeting with the selected user. To access a full list of interaction capabilities, the user may perform an action on the drop down menu 336.

In another example, as illustrated by FIG. 3C, a user may perform a double tap action 362 to select one or more users from the first display element 304. In response, the notebook application may present a third display element 364, where the third display element 364 may include one or more graphical icons 368 and/or textual representations 366 of available interaction capabilities with the selected user. The interaction capabilities may include to initiate communication with the selected user. For example, the user may send the selected user an instant message or an email message, start a conference or a video call, share, and/or schedule a meeting. The user may also find previous conversations, edit contact relationship, tag for status change alerts, and change a privacy relationship with the selected user.

Figure 4A:
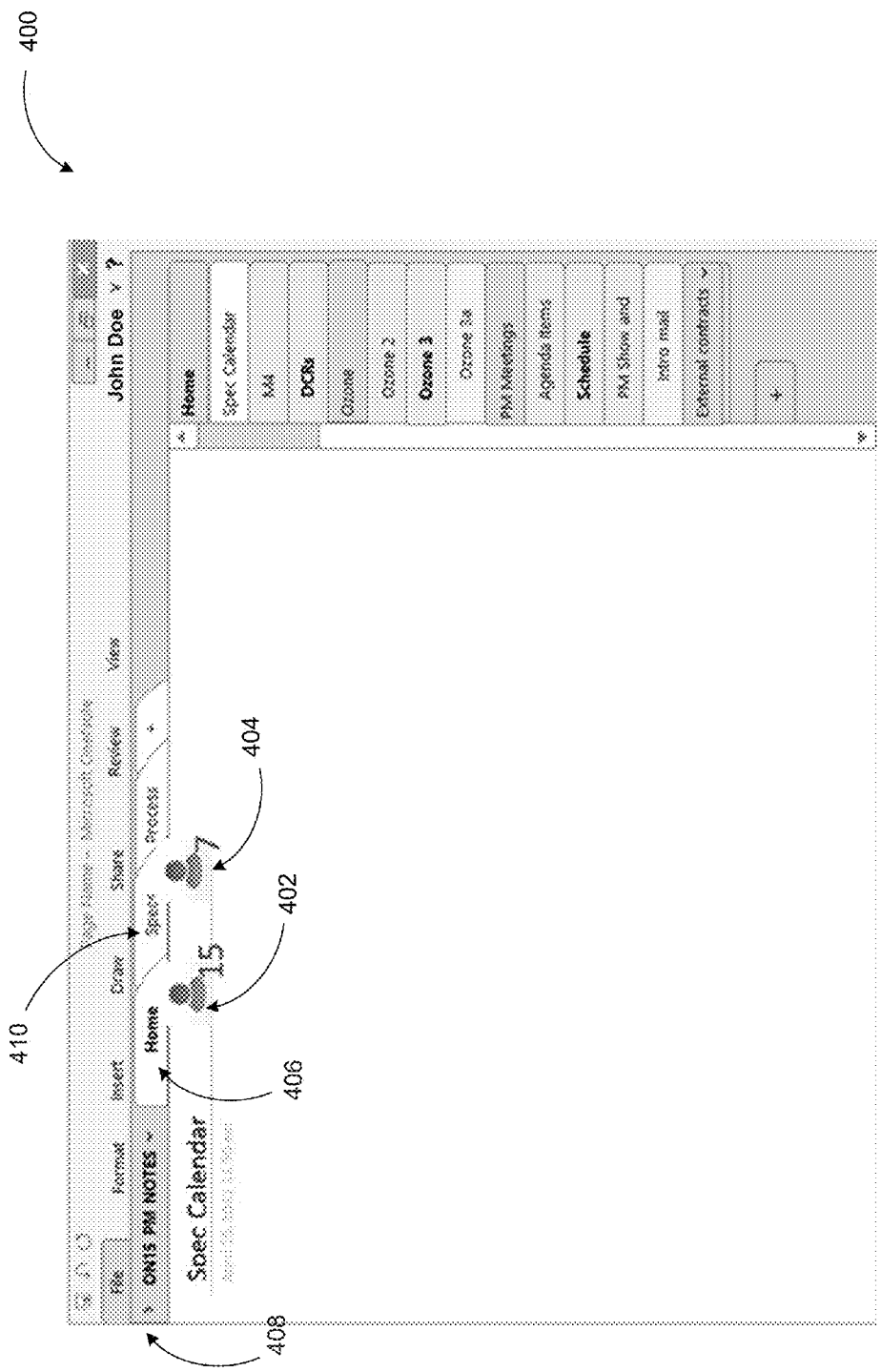
FIGS. 4A and 4B illustrate example schemes for presenting presence information through a user interface in a notebook application.
Figure 4B:

FIGS. 4A and 4B illustrate example visual schemes for presenting presence information through a user interface in a notebook application. In FIG. 4A, a graphical scheme and/or textual scheme may be employed to present the presence information through a user interface in conjunction with a location within the notebook application. In one example, 402 may indicate that fifteen users are currently located in a Home section 406 of an example notebook 408. In another example, 404 may indicate seven users may currently be located in a Specs section 410 of the example notebook 408. As illustrated in FIG. 4B, a shading scheme may also be employed to the present the presence information through a user interface in conjunction with a location within the notebook application. In one example, 452, a thinner, lighter shading may indicate that a lower number of users may currently be located in the Home section 406 of the example notebook 408 than the number of users currently located in the Specs section 410 of the example notebook 408, represented by a thicker darker shading 454.

In addition to the schemes illustrated in the above examples, an audio scheme, an animation scheme, a coloring scheme, and/or a highlighting scheme may be employed in conjunction with a location within the notebook application to present the presence information. These schemes may also be used to represent the tracked presence information presented by the notebook application through the user interface. For example, in FIG. 4A, 402 may indicate that fifteen users have edited the Home section 406 of the example notebook 408. In another example, in FIG. 4B, the darker, thicker shading 454 may indicate that the Specs section 410 of the example notebook 408 has been viewed more frequently than the Home section 406 of the example notebook 408.

The examples in FIG. 1 through 4 have been described with specific systems including with specific user interface elements, configurations, and presentations. Embodiments are not limited to systems according to these example configurations. Use of presence information in conjunction with contents maintained by a notebook application may be implemented in configurations using other types of systems including specific user interface elements, configurations, and presentations in a similar manner using the principles described herein.

Figure 5:
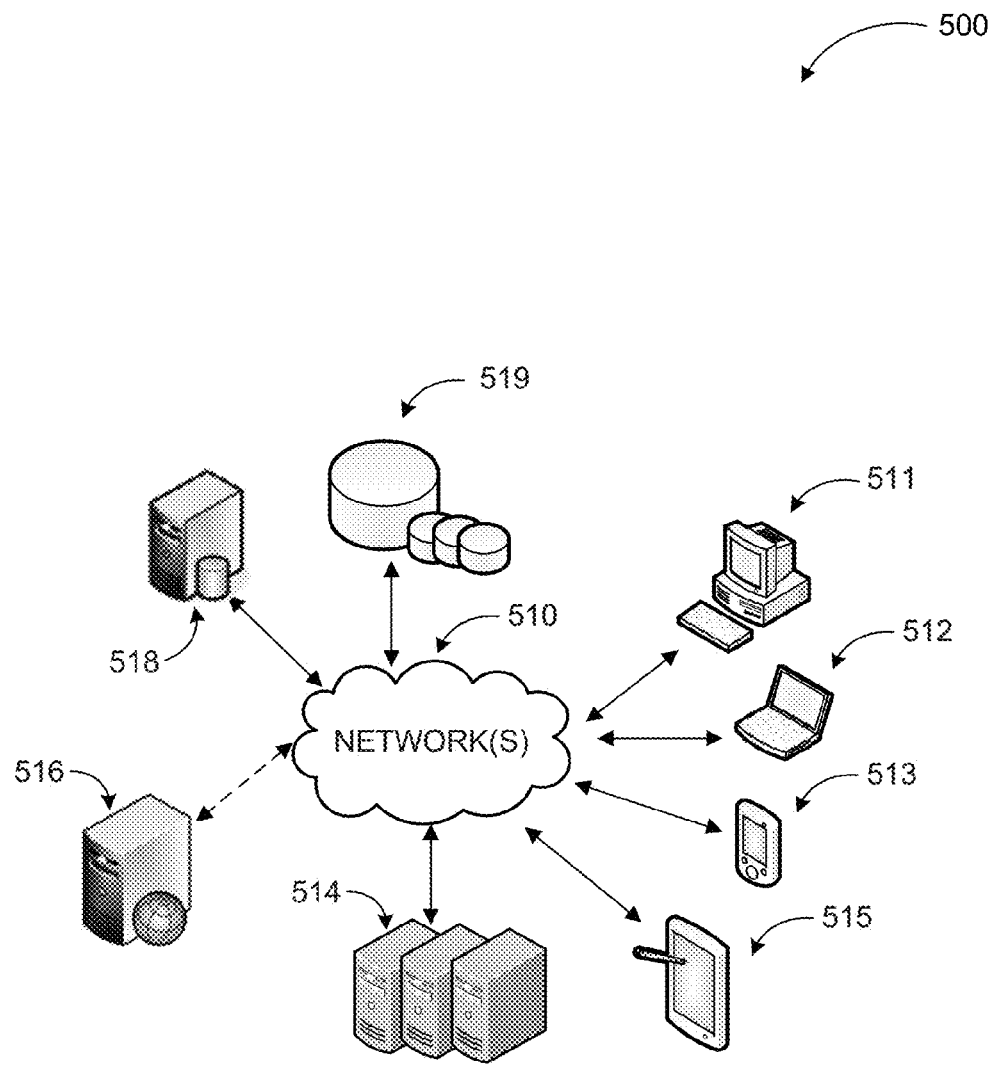
FIG. 5 is a networked environment, where a system according to embodiments may be implemented.

FIG. 5 is an example networked environment, where embodiments may be implemented. A system to employ presence information in a notebook application may be implemented via software executed over one or more servers 514 such as a hosted service. The platform may communicate with client applications on individual computing devices such as a smart phone 513, a tablet computer 515, a laptop computer 512, or desktop computer 511 ('client devices') through network(s) 510.

Client applications executed on any of the client devices 511-513 may facilitate communications via application(s) executed by servers 514, or on individual server 516. A notebook application executed on one of the servers may enable use of presence information. The notebook application may determine presence information of one or more users associated with the notebook application and present the presence information to the users through a user interface enabling interaction between the users and the user interface to employ the presence information. The notebook application may retrieve relevant data from data store(s) 519 directly or through database server 518, and provide requested services (e.g. document editing) to the user(s) through client devices 511-513.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing presence information in conjunction with a notebook application. Furthermore, the networked environments discussed in FIG. 5 are for illustration purposes only. Embodiments are not limited to the example applications, modules, or processes.

Figure 6:
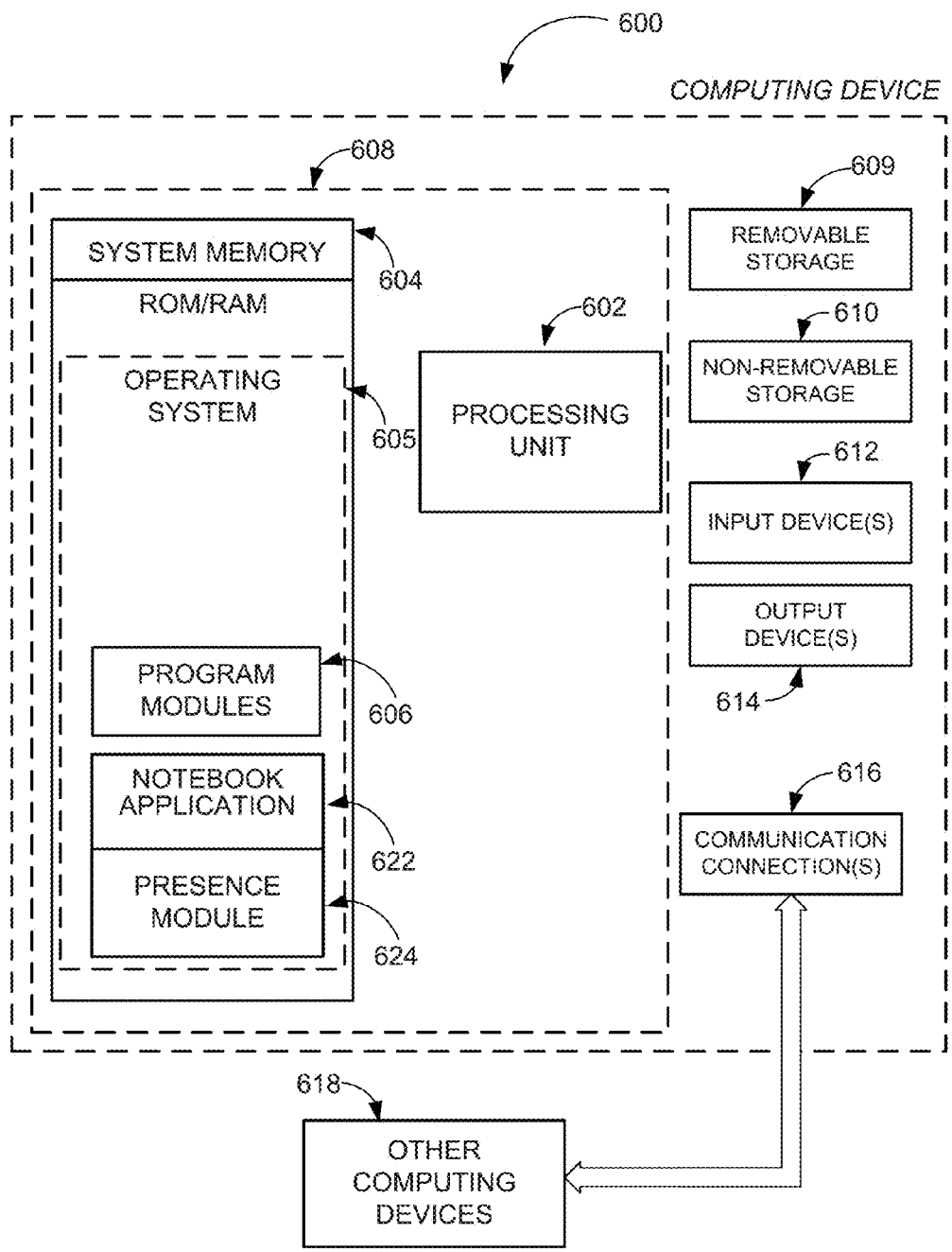
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any portable computing device with wireless communication capabilities, which may include touch and/or gesture detection capability in some examples, and include at least one processing unit 602 and system memory 604. Computing device 600 may also include multiple processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS®, WINDOWS MOBILE®, WINDOWS RT®, or WINDOWS PHONE®, and similar operating systems from MICROSOFT CORPORATION of Redmond, Wash. The system memory 604 may also include one or more software applications such as a notebook application 622, and a presence module 624.

The notebook application 622 may determine presence information for one or more users associated with the notebook application using a presence module 624 within the notebook application and one or more other presence services. The notebook application 622 may then present the presence information to the users through a user interface and enable the users to interact with the presence information through the user interface. The notebook application 622 and presence module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
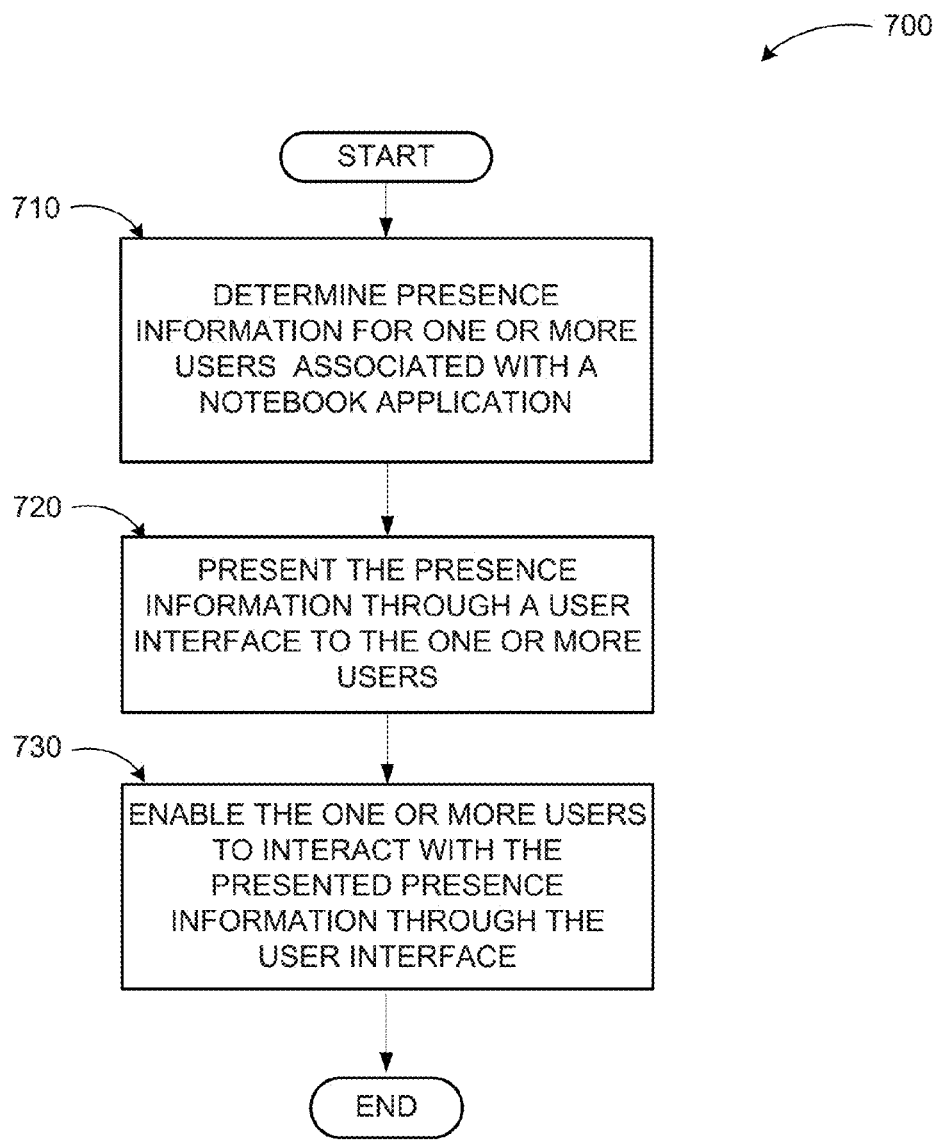
FIG. 7 illustrates a logic flow diagram of a method to employ presence information in conjunction with contents of a notebook application, according to embodiments.

FIG. 7 illustrates a logic flow diagram for process 700 of a method to employ presence information in context of contents maintained by a notebook application according to embodiments. Process 700 may be implemented on a server or other system.

Process 700 begins with operation 710, determine presence information for one or more users associated with a notebook application. The presence information may be determined by obtaining presence information from one or more presence services. The presence services may include a communication application, a social network, a professional network, and/or a presence module of the notebook application.

At operation 720, the presence information may be presented to the one or more users through a user interface associated with the notebook application. The presence information may be presented in conjunction with a location within the notebook application, such as a document, an object, a file, a page, a section, and/or a notebook. The presence information may also be presented a separate user interface positioned at any location within the user interface. The presence information may include which users are currently viewing and/or editing a document, object, file, page, section, and/or notebook.

The information may be presented employing one or more of a textual scheme, a graphical scheme, an audio scheme, an animation scheme, a coloring scheme, a highlighting scheme, and a shading scheme to enhance presentation of the presence information in the user interface. For example, to indicate a number of people currently viewing a section of a notebook within the notebook application, an icon and a numerical value associated with the number of people currently viewing may be presented in conjunction with the section of the notebook.

The notebook application may further track presence information for users within the notebook application and present the tracked presence information through the user interface. The tracked presence information may also be presented using a textual scheme, a graphical scheme, an audio scheme, an animation scheme, a coloring scheme, a highlighting scheme, and/or a shading scheme to enhance the presentation of the additional information in the user interface. For example, shading techniques may be used in conjunction with different sections within a notebook to present how often users have edited those sections. Heavily edited sections may have a darker, thicker shading than more lightly edited sections. Statistical information based on the tracked presence information may also be presented to the users. Based on the statistical information, the notebook application may automatically adjust a collaborative update frequency of documents, objects, files, pages, sections, and/or notebooks based on how frequently they are viewed and/or edited. Furthermore, the notebook application may automatically suggest to a user one or more documents, objects, files, pages, sections, and/or notebooks to view based on statistical information associated with the notebook application.

At operation 730, the notebook application may enable the one or more users to interact with the user interface to use the presented presence information in conjunction with contents of the notebook application. For example, a user may be enabled to initiate communication with one or more other users by selecting one or more graphical icons or textual representations presented within the user interface. The user may communicate via email message, instant message, call options, or through another communication application. In another example, a user may choose to follow another user and navigate to a location of the other user using an actionable link provided in the user interface if they want to see what the other user is viewing or any edits the other user is making. The user may define the presence information that will be presented to the user. The user may also be enabled to set credential based or permission based limitations to control the presence information presented to other users. For example, the user may choose to have their status information presented or the user may allow certain other users to have the presence information presented to them.

In one example, the tracked presence information and statistical information presented may enable the users to see which documents, pages, sections, and/or notebooks have received the most views and/or edits by other users and the users may prioritize those documents, objects, files, pages, sections, and/or notebooks. In another example, the tracked presence information presented may enable the users to see which documents, pages, sections, and/or notebooks have seldom been viewed or edited and the users may choose to clean up the notebook application to rid of those documents, objects, files, pages, sections, and or notebooks. The users may also choose to rediscover those documents, pages, sections, and/or notebooks.

The operations included in process 700 are for illustration purposes. Employing presence information in conjunction with a notebook application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method, executed at least in part by a computing device, to employ presence information in conjunction with a notebook application, the method comprising:
    determining presence information for one or more users associated with the notebook application, wherein the notebook application includes a plurality of documents, objects, files, pages, sections, and notebooks;
    presenting the presence information to the one or more users through a user interface associated with the notebook application to enable the one or more users interact with the presence information and contents of the notebook application based on the presented presence information;
    providing a contact card of the one or more users and a pin icon within the presence information, wherein
        the contact card includes a company associated with the one or more users, a position in the company associated with the one or more users, and a contact information of the one or more users, and
        the contact card is pinned as a frequent contact of the notebook application in response to an action on the pin icon;
    tracking the presence information in conjunction with a location within the notebook application; and
    presenting statistical information based on the tracked presence information in conjunction with one or more of a document, an object, a file, a page, a section, and a notebook within the notebook application, wherein the statistical information includes one or more of the document, the object, the file, the page, the section, and the notebook that has most views from the one or more users, the document, the object, the file, the page, the section, and the notebook that has most edits from the one or more users, and an average viewing time and editing time for the document, the object, the file, the page, the section, and the notebook.

2. The method of claim 1, wherein determining the presence information further comprises:
    obtaining presence information from at least one from a set of: a communication application, a social network, a professional network, and a presence module of the notebook application.

3. The method of claim 1, wherein presenting the presence information to the one or more users through a user interface associated with the notebook application further comprises one of:
    presenting the presence information in conjunction with a location within the notebook application; and presenting the presence information as a separate user interface.

4. The method of claim 3, wherein presenting the presence information to the one or more users through the user interface associated with the notebook application further comprises:
    employing at least one from a set of: a textual scheme, a graphical scheme, an audio scheme, an animation scheme, a coloring scheme, a highlighting scheme, and a shading scheme to enhance presentation of the presence information in the user interface.

5. The method of claim 1, further comprising:
    presenting the tracked presence information through the user interface associated with the notebook application.

6. The method of claim 1, wherein the tracked presence information includes one or more of: how many times a document, an object, a file, a page, a section, and a notebook are viewed and by which users; how many times the document, the object, the file, the page, the section, and the notebook are edited and by which users; how frequently the document, the object, the file, the page, the section, and the notebook are viewed; and how frequently the document, the object, the file, the page, the section, and the notebook are edited.

7. The method of claim 1, further comprising:
    tracking the presence information in conjunction with the one or more users of other notebooks; and
    presenting the tracked presence information through the user interface associated with the notebook application.

8. The method of claim 1, further comprising:
    enabling the one or more users to initiate communication with one or more other users through the user interface; and
    enabling the one or more users to navigate to one or more locations at which one or more other users are currently located by providing an actionable link within the presented presence information, wherein the one or more locations include one of locations within a same notebook and locations in other notebooks.

9. The method of claim 1, further comprising:
    enabling the one or more users to interact with the user interface by one or more of: a tap action, a swipe action, a mouse input, a pen input, and a keyboard input.

10. The method of claim 1, further comprising:
    enabling the one or more users to set at least one of credential based and permission based limitations to control the presence information that is available for presentation to one or more other users.

11. A computing device to employ presence information in conjunction with a notebook application, the computing device comprising:
a memory;
a processor coupled to the memory, the processor executing a notebook application and causing a user interface associated with the notebook application to be presented, wherein the notebook application is configured to:
  determine presence information for one or more users associated with the notebook application, wherein the notebook application includes a plurality of documents, objects, files, pages, sections, and notebooks;
  present the presence information to the one or more users through the user interface associated with the notebook application;
  provide a contact card of the one or more users and a pin icon within the presence information, wherein
    the contact card includes a company associated with the one or more users, a position in the company associated with the one or more users, and a contact information of the one or more users, and
    the contact card is pinned as a frequent contact of the notebook application in response to an action on the pin icon;
  track the presence information in conjunction with a location within the notebook application;
  enable the one or more users to interact with the tracked presence information and contents of the notebook application based on the presented presence information; and
  present statistical information based on the tracked presence information in conjunction with one or more of a document, an object, a file, a page, a section, and a notebook within the notebook application, wherein the statistical information includes one or more of the document, the object, the file, the page, the section, and the notebook that has most views from the one or more users, the document, the object, the file, the page, the section, and the notebook that has most edits from the one or more users, and an average viewing time and editing time for the document, the object, the file, the page, the section, and the notebook.

12. The computing device of claim 11, wherein the presented presence information includes one or more of identities of the one or more users that are currently viewing a document, an object, a file, a page, a section, and a notebook within the notebook application and identities of the one or more users that are currently editing a document, an object, a file, a page, a section, and a notebook within the notebook application.

13. The computing device of claim 11, wherein the notebook application is further configured to automatically adjust an update frequency of one or more of the document, the page, the section, and the notebook based on the statistical information.

14. The computing device of claim 11, wherein the notebook application is further configured to automatically suggest one or more of the document, the object, the file, the page, the section, and the notebook to a user based on the statistical information.

15. The computing device of claim 11, wherein a user is enabled to define the presence information presented to the user through the user interface.

16. A computer-readable memory device with instructions stored thereon to employ presence information in conjunction with a notebook application, the instructions comprising:
determining presence information for one or more users associated with the notebook application, wherein the notebook application includes a plurality of documents, objects, files, pages, sections, and notebooks;
presenting the presence information to the one or more users through one of: a user interface in conjunction with a location within the notebook application and a separate user interface;
providing a contact card of the one or more users and a pin icon within the presence information, wherein
  the contact card includes a company associated with the one or more users, a position in the company associated with the one or more users, and a contact information of the one or more users, and
  the contact card is pinned as a frequent contact of the notebook application in response to an action on the pin icon;
tracking the presence information in conjunction with a location within the notebook application;
presenting the tracked presence information to the one or more users through one of: a user interface in conjunction with a location within the notebook application and a separate user interface;
enabling the one or more users to interact with the presented presence information and the tracked presence information through the user interface; and
presenting statistical information based on the tracked presence information in conjunction with one or more of a document, an object, a file, a page, a section, and a notebook within the notebook application, wherein the statistical information includes one or more of the document, the object, the file, the page, the section, and the notebook that has most views from the one or more users, the document, the object, the file, the page, the section, and the notebook that has most edits from the one or more users, and an average viewing time and editing time for the document, the object, the file, the page, the section, and the notebook.

17. The computer-readable memory device of claim 16, wherein the tracked presence information is further presented to one or more of: a communication application, a social network, a professional network, and a presence module of the notebook application.

18. The computer-readable memory device of claim 16, further comprising enabling the one or more users to employ the presented presence information and the tracked presence information to one of: prioritize one or more of a document, an object, a file, a page, a section, and a notebook, clean up a notebook to remove unused documents, objects, files, pages, sections, and notebooks, rediscover one or more a document, an object, a file, a page, a section, and a notebook, and follow other users to one or more of a document, an object, a file, a page, a section, and a notebook.

* * * * *